United States Patent Office

2,771,368
Patented Nov. 20, 1956

2,771,368

STABILIZATION OF ORGANIC COMPOUNDS

Ralph B. Thompson, Hinsdale, Ill., assignor to Universal Oil Products Company, Des Plaines, Ill., a corporation of Delaware No Drawing. Application November 20, 1953, Serial No. 393,517

17 Claims. (Cl. 99—163)

This invention relates to the stabilization of organic compounds which tend to deteriorate in storage or in use due to oxidation or other reactions.

The novel method of the present invention may be utilized for the stabilization of various organic materials which are unstable in storage, during treatment and/or in use, and include motor fuel, particularly unsaturated gasoline, jet fuel, diesel oil, mineral oil, lubricating oil, fuel oil, drying oil, greases, waxes, rubber, edible fats and oils, forage crops, monomers including styrene, butadiene, isoprene, acetylenes, etc., various unsaturated alcohols, acids, ketones, etc. These materials are adversely affected by oxygen, with the resultant formation of undesirable gum, discoloration, rancidity or other deleterious reaction products.

The invention is particularly applicable to the stabilization of motor fuel and still more particularly unsaturated gasolines including cracked gasoline, polymer gasoline, etc. In storage or during transportation and/or treatment these unsaturated gasolines tend to form undesirable gums and/or undergo discoloration. The invention is also applicable to the treatment of aviation gasolines which tend to undergo deterioration due to the addition of tetraethyl lead fluid or due to other components in the gasoline.

The invention is also particularly applicable to the stabilization of edible fats and oils, which may be of animal, vegetable or mineral origin and which tend to become rancid, especially during long periods of storage prior to use. Typical representatives of those edible fats and oils include linseed oil, menhaden oil, cod liver oil, castor oil, olive oil, rapeseed oil, coconut oil, palm oil, corn oil, sesame oil, peanut oil, babassu oil, butter, fat, lard, beef tallow, etc. It is understood that other oils and fats may be treated within the scope of the present invention, including oils and fats which previously have been subjected to various treatments, such as blowing with air, heat treatment, hydrogenation, etc.

In another embodiment the present invention may be applied to the treatment of crops by dusting or spraying in order to preserve food accessory factors such as carotene, vitamins, various fatty acids, alcohols, etc.

In one embodiment the present invention relates to a method of stabilizing an organic material against deterioration which comprises incorporating therein an inhibitor comprising a 3,4,5-trialkoxyaniline.

In a specific embodiment the present invention relates to a method of stabilizing a fatty material which comprises incorporating therein from about 0.0001% to about 1% by weight of 3,4,5-trimethoxyaniline.

In another specific embodiment, the present invention relates to a method of stabilizing cracked gasoline which comprises incorporating therein from about 0.0001% to about 1% by weight of N-isopropyl-3,4,5-trimethoxyaniline.

As hereinbefore set forth, the novel inhibitor of the present invention comprises a 3,4,5-trialkoxyaniline. A particularly preferred compound comprises a 3,4,5-trimethoxyaniline. Other compounds include a 3,4,5-triethoxyaniline, 3,4,5-tripropoxyaniline, 3,4,5-tributoxyaniline, 3,4,5-tripentoxyaniline, 3,4,5-trihexoxyaniline, etc., 3,5-dimethoxy-4-ethoxyaniline, 3,5-dimethoxy-4-propoxyaniline, 3,5-dimethoxy-4-butoxyaniline, 3,5-dimethoxy - 4 - pentoxyaniline, 3,5-dimethoxy-4-hexoxyaniline, etc., 3,5-diethoxy-4-methoxyaniline, 3,5-diethoxy-4-propoxyaniline, 3,5-diethoxy-4-butoxyaniline, 3,5-diethoxy-4-hexoxyaniline, etc., 3,4-dimethoxy-5-ethoxyaniline, 3,4-dimethoxy-5-propoxyaniline, 3,4-dimethoxy-5-butoxyaniline, 3,4-dimethoxy-5-pentoxyaniline, 3,4-dimethoxy-5-hexoxyaniline, etc.

In another preferred embodiment, one or both of the hydrogen atoms attached to the nitrogen atom may be substituted by hydrocarbon or other groups. The hydrocarbon groups include alkyl, alkenyl, cycloalkyl, cycloalkalkyl, alkcycloalkyl, aryl, alkaryl, aralkyl, etc. Representative compounds in this class include N-methyl-3,4,5-trimethoxyaniline, N-methyl-3,4,5-triethoxyaniline, N-methyl-3,4,5-tripropoxyaniline, N-methyl-3,4,5-tributoxyaniline, N-methyl-3,4,5-tripentoxyaniline, N-methyl-3,4,5-trihexoxyaniline, etc., N-ethyl-3,4,5-trimethoxyaniline, N-ethyl-3,4,5-triethoxyaniline, N-ethyl-3,4,5-tripropoxyaniline, N-ethyl-3,4,5-tributoxyaniline, N-ethyl-3,4,5-tripentoxyaniline, N-ethyl-3,4,5-trihexoxyaniline, etc., N-propyl-3,4,5-trimethoxyaniline, N-propyl-3,4,5-triethoxyaniline, N-propyl-3,4,5-tripropoxyaniline, N-propyl-3,4,5-tributoxyaniline, N-propyl-3,4,5-tripentoxyaniline, N-propyl-3,4,5-trihexoxyaniline, etc., N-butyl-3,4,5-trimethoxyaniline, N-butyl-3,4,5-triethoxyaniline, N-butyl-3,4,5-tripropoxyaniline, N-butyl-3,4,5-tributoxyaniline, N-butyl-3,4,5-tripentoxyaniline, N-butyl-3,4,5-trihexoxyaniline, etc., N-amyl-3,4,5-trimethoxyaniline, N-amyl-3,4,5-triethoxyaniline, N-amyl-3,4,5-tripropoxyaniline, N-amyl-3,4,5-tributoxyaniline, N-amyl-3,4,5-tripentoxyaniline, N-amyl-3,4,5-trihexoxyaniline, etc., N-hexyl-3,4,5-trimethoxyaniline, N-hexyl-3,4,5-triethoxyaniline, N-hexyl-3,4,5-tripropoxyaniline, N-hexyl-3,4,5-tributoxyaniline, N-hexyl-3,4,5-tripentoxyaniline, N-hexyl-3,4,5-trihexoxyaniline, etc., N,N-dimethyl-3,4,5-trimethoxyaniline, N,N-dimethyl - 3,4,5 - triethoxyaniline, N,N-dimethyl-3,4,5-tripropoxyaniline, N,N-dimethyl-3,4,5-tributoxyaniline, N,N-dimethyl-3,4,5-tripentoxyaniline, N,N-dimethyl-3,4,5-trihexoxyaniline, etc., N,N-diethyl-3,4,5-trimethoxyaniline, N,N-diethyl-3,4,5-triethoxyaniline, N,N-diethyl-3,4,5-tripropoxyaniline, N,N-diethyl-3,4,5-tributoxyaniline, N,N-diethyl-3,4,5-tripentoxyaniline, N,N-diethyl-3,4,5-trihexoxyaniline, etc., N,N-dipropyl-3,4,5-trimethoxyaniline, N,N-dipropyl-3,4,5-triethoxyaniline, N,N-dipropyl-3,4,5-tripropoxyaniline, N,N - dipropyl-3,4,5-tributoxyaniline, N,N-dipropyl-3,4,5-tripentoxyaniline, N,N-dipropyl-3,4,5-trihexoxyaniline, etc., N,N-dibutyl-3,4,5-trimethoxyaniline, N,N-dibutyl-3,4,5-triethoxyaniline, N,N-dibutyl-3,4,5-tripropoxyaniline, N,N-dibutyl-3,4,5-tributoxyaniline, N,N-dibutyl-3,4,5-tripentoxyaniline, N,N-dibutyl-3,4,5-trihexoxyaniline, etc., N,N-diamyl-3,4,5-trimethoxyaniline, N,N-diamyl-3,4,5-triethoxyaniline, N,N-diamyl-3,4,5-tripropoxyaniline, N,N - diamyl-3,4,5-tributoxyaniline, N,N-diamyl-3,4,5-tripentoxyaniline, N,N-diamyl-3,4,5-trihexoxyaniline, etc., N,N-dihexyl-3,4,5-trimethoxyaniline, N,N-dihexyl-3,4,5-triethoxyaniline, N,N-dihexyl-3,4,5-tripropoxyaniline, N,N-dihexyl-3,4,5-tributoxyaniline, N,N-dihexyl-3,4,5-tripentoxyaniline, N,N-dihexyl-3,4,5-trihexoxyaniline, etc., N-methyl-3,5-dimethoxy-4-ethoxyaniline, N-methyl-3,5-dimethoxy-4-propoxyaniline, etc., N-methyl-3,5-diethoxy-4-methoxyaniline, N-methyl-3,5-propoxy-4-methoxyaniline, N - methyl-3,5-butoxy-4-methoxyaniline, etc., N-methyl-3,5-dimethoxy-4-diethoxyaniline, N-ethyl-3,5-dimethoxy-4-propoxyaniline, etc., N-propyl-3,5-dimethoxy-4-ethoxyaniline, N - propyl-3,5-dimethoxy-4-propoxyaniline, etc., N-butyl-3,5-dimethoxy-4-ethoxyaniline, N-butyl-3,5-dimethoxy-4-propoxyaniline, etc., N,N-dimethyl-3,5-dimethoxy-4-ethoxyaniline, N,N-dimethyl-3,5-dimethoxy-4-propoxyaniline, etc., N,N-diethyl-3,5-dimethoxy-4-ethoxyaniline, N,N-diethyl-3,5-dimethoxy-4-propoxyaniline, etc., N,N-dipropoyl-3,5-dimethoxy-4-ethoxyaniline, N,N-dipropyl-3,5-dimethoxy-4-propoxyaniline, etc., N,N-dibutyl-3,5-dimethoxy-4-ethoxyaniline, N,N-dibutyl-3,5-dimethoxy-4-propoxyaniline, etc.

Compounds containing substituents other than alkyl groups replacing one or both of the hydrogen atoms attached to the nitrogen atom may be illustrated by the following: N-cyclohexyl-3,4,5-trimethoxyaniline, N-cyclohexyl-3,4,5-triethoxyaniline, etc., N,N-dicyclohexyl-3,4,5-trimethoxyaniline, N,N-dicyclohexyl-3,4,5-triethoxyaniline, etc., N-cyclohexylmethyl-3,4,5-trimethoxyaniline, N-cyclohexylmethyl-3,4,5-triethoxyaniline, etc., N,N-dicyclohexylmethyl-3,4,5-trimethoxyaniline, N,N-dicyclohexylmethyl-3,4,5-triethoxyaniline, etc., N-cyclohexylethyl-3,4,5-trimethoxyaniline, N-cyclohexylethyl-3,4,5-triethoxyaniline, etc., N,N-dicyclohexylethyl-3,4,5-trimethoxyaniline, N-dicyclohexylethyl-3,4,5-triethoxyaniline, etc., N-phenyl-3,4,5-trimethoxyaniline, N-phenyl-3,4,5-triethoxyaniline, etc., N,N-diphenyl-3,4,5-trimethoxyaniline, N,N-diphenyl-3,4,5-triethoxyaniline, etc., N-naphthyl-3,4,5-trimethoxyaniline, N-naphthyl-3,4,5-triethoxyaniline, etc., N,N-dinaphthyl-3,4,5-trimethoxyaniline, N,N-dinaphthyl-3,4,5-triethoxyaniline, etc., N-tolyl-3,4,5-trimethoxyaniline, N-tolyl-3,4,5-triethoxyaniline, etc., N,N-ditolyl-3,4,5-trimethoxyaniline, N,N-ditolyl-3,4,5-triethoxyaniline, etc., N-xylyl-3,4,5-trimethoxyaniline, N-xylyl-3,4,5-triethoxyaniline, etc., N,N-dixylyl-3,4,5-trimethoxyaniline, N,N-dixylyl-3,4,5-triethoxyaniline, etc., N-benzyl-3,4,5-trimethoxyaniline, N-benzyl-3,4,5-triethoxyaniline, etc., N,N-dibenzyl-3,4,5-trimethoxyaniline, N,N-dibenzyl-3,4,5-triethoxyaniline, etc.

In some cases the 3,4,5-trialkoxyaniline, the N-alkyl-3,4,5-trialkoxyaniline or the N-dialkyl-3,4,5-trialkoxyaniline, may contain one or more hydrocarbons or other substituents attached to the ring. The substituents preferably comprise alkyl groups, including methyl, ethyl, propyl, butyl, amyl, hexyl, heptyl, octyl, etc., and still more particularly are of branched chain structure, including isopropyl, secondary butyl, tertiary butyl, secondary amyl, tertiary amyl, secondary hexyl, tertiary hexyl, etc. In other cases, the alkyl group may have nitrogen, oxygen and/or sulfur attached thereto. In still other cases, the substituent may comprise a cyclic radical including cyclohexyl, phenyl, heterocyclic ring radicals containing oxygen, nitrogen and/or sulfur in the ring, etc.

It is apparent that numerous compounds may be prepared and utilized in accordance with the present invention. However, all these compounds are not necessarily equivalent and may be of different effectiveness in different substrates.

The inhibitor compound of the present invention generally is incorporated in the organic material to be stabilized in an amount of below about 1% by weight and preferably in an amount within the range of from about 0.0001% to about 1% by weight. When used in gasoline, it is understood that the inhibitor compound may be utilized in conjunction with various dyes, synergists, metal deactivators, antiknock agents, such as tetraethyl lead, iron carbonyl, etc., rust inhibitors, etc. When used in edible fats and oils, the inhibitor compound may be used in conjunction with synergists such as citric acid, phosphoric acid, ascorbic acid, etc., and/or in combination with other inhibitors and other compounds added for specific purposes. The inhibitor may be utilized as such or in a suitable solvent, including hydrocarbons, alcohols, glycols, ethers, ketones, etc. When desired, the inhibitor compound may be marketed as a solution alone or with other additives to be incorporated in the organic material.

The following examples are introduced to illustrate further the novelty and utility of the present invention but not with the intention of unduly limiting the same.

Example I 3,4,5-trimethoxyaniline, having a melting point of 112–113° C., was utilized for the stabilization of Pennsylvania cracked gasoline having an induction period of 35 minutes. 0.05% by weight of 3,4,5-trimethoxyaniline was incorporated in a sample of the gasoline, and this served to increase the induction period of the gasoline to 275 minutes.

Example II

N-isopropyl-3,4,5-trimethoxyaniline was incorporated in another sample of the gasoline described in Example I. 0.05% by weight of the additive increased the induction period of the gasoline to 455 minutes.

Example III

Another sample of the N-isopropyl-3,4,5-trimethoxyaniline referred to in Example II was utilized for the stabilization of lard having a normal stability period of 5 hours as determined by the Swift test. This test is described in detail in the article by A. E. King, H. L. Roschen and W. H. Irwin, which appeared in "Oil and Soap," vol. X, No. 6, pages 105–109 (1933), and modified as described in the article by R. W. Reimenschneider, J. Turer and R. M. Spec, which appeared in "Oil and Soap," pages 169–171 (September 1943). In general this test comprises bubbling air through a sample of lard and determining rancidity organoleptically and by peroxide numbers. The results of these tests are reported as A. O. M. stability period, which is the number of hours required to reach a peroxide number of 20.

0.02% by weight of N-isopropyl-3,4,5-trimethoxyaniline increased the stability period of the lard from 5 hours to 42 hours. It thus is seen that the inhibitor compound serves to considerably increase the stability period of the lard.

Example IV 0.04% by weight of N-butyl-3,4,5-triethoxyaniline may be incorporated in cracked gasoline having an induction period of about 90 minutes. This will serve to increase the induction period of the gasoline.

Example V 3,4,5-triethoxyaniline may be utilized in a concentration of 0.02% by weight to stabilize styrene. The effectiveness of the inhibitor may be determined in the following manner.

A sample of styrene and another sample of the styrene containing the inhibitor are each sealed in separate small glass tubes having long, thin necks. The tubes may be heated at 80° C. for ten hours or at higher temperature and/or for a long period of time when required. Periodically the tubes are inverted, and the change in viscosity is determined by observing "bubble time"; that is, the time necessary for a bubble to rise to the top of the thin neck when the tube is inverted at 25° C. Increase in viscosity indicates deterioration of the sample caused by oxidation, gum formation, polymerization, etc.

Example VI

This example relates to the use of an inhibitor of the present invention in the stabilization of rubber. 0.8% by weight of N-cyclohexyl-3,4,5-tripropoxyaniline is added to the latex resulting from the emulsion polymerization of butadiene and styrene, after which the latex is coagulated and dried. The rubber so produced will be improved as to retention of color, strength, elasticity, etc.

I claim as my invention:

1. An organic material normally subject to oxidative deterioration containing an antioxidizing amount of a 3,4,5-trialkoxyaniline.

2. An organic material normally subject to oxidative deterioration containing from about 0.0001% to about 1% by weight of a 3,4,5-trimethoxyaniline.

3. An organic material normally subject to oxidative deterioration containing from about 0.0001% to about 1% by weight of a 3,4,5-triethoxyaniline.

4. An organic material normally subject to oxidative deterioration containing from about 0.0001% to about 1% by weight of a 3,4,5-tripropoxyaniline.

5. An organic material normally subject to oxidative deterioration containing from about 0.0001% to about 1% by weight of a N-alkyl-3,4,5-trialkoxyaniline.

6. Organic material subject to oxidative deterioration in storage containing, as an additive to retard said deterioration from about 0.0001% to about 1% by weight of a 3,4,5-trialkoxyaniline.

7. Organic material normally subject to oxidative deterioration containing from about 0.0001% to about 1% by weight of 3,4,5-trimethoxyaniline.

8. Organic material subject to oxidative deterioration in storage containing, as an additive to retard said deterioration, from about 0.0001% to about 1% by weight of N-isopropyl-3,4,5-trimethoxyaniline.

9. Organic material normally subject to oxidative deterioration containing from about 0.0001% to about 1% by weight of a N,N-dialkyl-3,4,5-trialkoxyaniline.

10. Fatty material selected from the group consisting of animal and veggetable fats and oils normally subject to oxidative deterioration containing from about 0.0001% to about 1% by weight of a 3,4,5-trialkoxyaniline.

11. Fatty material selected from the group consisting of animal and vegetable fats and oils normally subject to oxidative deterioration containing from about 0.0001% to about 1% by weight of N,N-dimethyl-3,4,5-trimethoxyaniline.

12. Lard normally subject to oxidative deterioration in storage containing from about 0.0001% to about 1% by weight of N-isopropyl-3,4,5-trimethoxyaniline.

13. Hydrocarbon subject to oxidative deterioration containing from about 0.0001% to about 1% by weight of a 3,4,5-trialkoxyaniline.

14. Cracked gasoline subject to oxidative deterioration in storage containing from about 0.0001% to about 1% by weight of N-isopropyl-3,4,5-trimethoxyaniline.

15. Styrene subject to oxidative deterioration containing from about 0.0001% to about 1% by weight of a 3,4,5-trialkoxyaniline.

16. Rubber subject to oxidative deterioration in storage containing from about 0.0001% to about 1% by weight of a 3,4,5-trialkoxyaniline.

17. Wax subject to oxidative deterioration containing from about 0.0001% to about 1% by weight of a 3,4,5-trialkoxyaniline.

References Cited in the file of this patent

UNITED STATES PATENTS

| | | |
|---|---|---|
| 2,282,810 | Musher | May 12, 1942 |
| 2,300,246 | Chenicek | Oct. 27, 1942 |